US006903771B2

(12) United States Patent
Sakuragi

(10) Patent No.: US 6,903,771 B2
(45) Date of Patent: Jun. 7, 2005

(54) IMAGE PICKUP APPARATUS

(75) Inventor: Takamasa Sakuragi, Hiratsuka (JP)

(73) Assignee: Canon Kabushiki Kaisha, Tokyo (JP)

(*) Notice: Subject to any disclaimer, the term of this patent is extended or adjusted under 35 U.S.C. 154(b) by 837 days.

(21) Appl. No.: 09/793,914

(22) Filed: Feb. 28, 2001

(65) Prior Publication Data
US 2001/0033337 A1 Oct. 25, 2001

(30) Foreign Application Priority Data

Mar. 2, 2000 (JP) .......................... 2000-057462
Feb. 21, 2001 (JP) .......................... 2001-045338

(51) Int. Cl.$^7$ ..................... H04N 3/14; H04N 5/335
(52) U.S. Cl. ..................... 348/308
(58) Field of Search ..................... 348/294, 300, 348/302, 308; 250/208.1; 257/291, 292, 293

(56) References Cited

U.S. PATENT DOCUMENTS

| | | | |
|---|---|---|---|
| 5,278,656 A | * 1/1994 | Hynecek et al. | 348/294 |
| 5,856,686 A | * 1/1999 | Watanabe et al. | 257/291 |
| 5,998,818 A | * 12/1999 | Kumagai et al. | 257/291 |
| 2002/0149688 A9 | * 10/2002 | Matsunaga et al. | 348/308 |
| 2003/0179304 A1 | * 9/2003 | Kuroda et al. | 348/308 |

FOREIGN PATENT DOCUMENTS

JP        8-18866        1/1996        .......... H04N/5/335

* cited by examiner

Primary Examiner—Wendy R. Garber
Assistant Examiner—Jason Whipkey
(74) Attorney, Agent, or Firm—Fitzpatrick, Cella, Harper & Scinto

(57) ABSTRACT

Disclosed is an image pickup apparatus, which comprises a two-dimensional image pickup area, a vertical line selector for selecting a reading row in said image pickup area, a plurality of vertical signal lines arranged in columnar direction, for reading a detection signal emitted by a photodiode located in a selected row, and a horizontal selection transistor for continuously reading detection signals carried by the vertical signal lines and writing the signals to a horizontal signal line arranged like a row in a matrix, wherein a noise canceling circuit that employs a capacitor to suppress noise that appears on the vertical signal lines is provided between the vertical signal lines and the horizontal selection transistor, wherein an impedance conversion unit is provided between the vertical signal lines and the capacitor of the noise canceling circuit, and wherein a constant current element for supplying a bias current and a switch for changing the output current of a constant current element are provided to the impedance conversion unit.

16 Claims, 11 Drawing Sheets

IMAGE PICKUP APPARATUS

BACKGROUND OF THE INVENTION

1. Field of the Invention

The present invention relates to an image pickup apparatus including a photoelectric converter.

2. Related Background Art

Conventionally, a solid-state image pickup device has been proposed that instead of reading out a signal charge itself generated for each pixel, converts the signal charge for each pixel into a voltage or a current, amplifies the voltage or the current, and reads out the obtained signal voltage or current through a scanning circuit. This image pickup device is called an amplification-type solid-state active pixel sensor. FIG. 1 is a diagram showing an amplification-type MOS sensor, which is a conventional solid-state active pixel sensor.

In FIG. 1, signal charges accumulated by photodiodes 1 in cells are read out as voltages by amplifying transistors 2 to vertical signal lines 8. Since the amplifying transistors 2 and load transistors 9, which are constant current sources, form a source follower circuit, voltages corresponding to the amount of the signal charges on the photodiodes 1 are read out from the vertical signal lines 8. Each of the cells includes a photodiode 1, a reset transistor 4 for resetting the photodiode 1, a selection MOS transistor 3 for selecting the photodiode 1 whose signal charge is read out to the vertical signal line 8, and an amplifying transistor 2.

In the solid-state image pickup device wherein the above-described cells are two dimensionally arranged, fixed pattern noise is generated that corresponds to fluctuation of the threshold voltage of the amplifying transistor 2, and the image quality is deteriorated. Thus, various noise canceling circuits have been proposed. The structure and the operation of a noise canceling circuit will now be described while referring to the timing chart in FIG. 2. When a pulse 101 is applied to a selected signal line 6-1, extending from the vertical shift register 5, and the MOS transistor 3 is rendered active, the rows of amplifying transistors 2-1-1, 2-1-2, . . . are activated, and output signal voltages which correspond to signal charges accumulated by the photodiodes 1-1-1, 1-1-2, . . . are read out to the vertical signal lines 8 (8-1, 8-2). During a period wherein the pulse for activating each cell of the solid-state image pickup device is at level "H" (pulse 101), the voltage "H" (pulse 102) is applied to the gates of clamp transistors 11 (11-1, 11-2, . . . ), the clamp transistors 11 are turned on, and vertical signal lines 15 (15-1, 15-2, . . . ) are clamped at a clamp voltage 24.

Thereafter, the voltages of the photodiodes 1 (1-1-1, 1-1-2, . . . ) are reset by applying the voltage "H" (pulse 104) to reset signal lines 7 (7-1, 7-2, . . . ). This reset voltage appears on the vertical signal lines 8 (8-1, 8-2, . . . ), and is transmitted by clamp capacitors 10 (10-1, 10-2, . . . ) to the vertical signal lines 15 (15-1, 15-2, . . . ). Since the base voltage for each pixel equals the clamp voltage, fluctuation in the threshold voltages of the MOS transistors can be suppressed. Thereafter, when sample-hold transistors 12 (12-1, 12-2, . . . ) are turned on, a signal is transmitted to vertical signal lines 16 (16-1, 16-2, . . . ), following which a horizontal selection transistor 14 (14-1, 14-2, . . . ) is selected by a selection pulse 105, 106, . . . from a horizontal shift register 19, and a signal voltage for a selected row is read out.

As is described above, since only the voltage change on the vertical signal line 8, caused after the photodiode 1 is reset can be read out to the vertical signal line 16, the affect of fluctuation in the threshold voltage of the amplifying transistor 2 can be suppressed. Especially since the noise element is removed from the output voltage of each solid-state image pickup device that nullifies the affect of the fluctuation in the threshold voltages, only a signal element from which a fluctuation has been removed can be obtained on the horizontal output line.

Further, disclosed in Japanese Patent Application Laid-Open No. 8-18866 is a configuration wherein a current mirror is employed for the load transistor that is the constant current source in FIG. 1. Specifically, the solid-state image pickup device comprises multiple read transistors for reading out a charge obtained by photoelectric conversion to a signal line, and current control means for controlling a current flowing across the constant current source at a time other than when the reading operation is performed by the read transistors. A current mirror circuit is formed for the load transistor, which is the constant current source, to reduce the power consumption when the load transistor is used. However, in this application, an increase in the speed of the processing for the reading circuit is not specifically described.

In the prior art, the amplifying transistors 2 of the sensor cells must drive the clamp capacitors at high speed to rapidly read out the signal output by each sensor cell. Further, in order to increase operation speed, the output impedance of a source follower circuit which is constituted by the amplifying transistor 2 and the load transistor 9, must be reduced appropriately.

Therefore, the ratio (W/L) of the gate width (W) and the gate length (L) of the amplifying transistor 2 must be increased, and a bias drain current for the amplifying transistor 2 must be increased. Since an amplifying transistor 2 is provided in each pixel, an increase in the gate width is not preferable because the chip size of the solid-state image pickup device is increased. Further, an increase in the bias drain current by the load transistor 9 is also a problem because it is accompanied with an increase in power consumption.

In addition, when the clamp capacity is reduced, the above problem does not occur, and high-speed driving is enabled. But when the capacitance of the clamp capacitor is reduced, random noise that is generated by the sensor cell and the reading circuit including the clamp capacitor, is proportional to $\sqrt{1/C}$ (C is the capacitance of the clamp capacitor) (no explanation for this is given here). Thus, random noise is increased. Further, when the clamp capacitance is reduced, the signal is easily affected by parasite capacitance that depends on the layout of the chip, and the fluctuation in the sensor signals is increased.

SUMMARY OF THE INVENTION

It is, therefore, one objective of the present invention to provide a solid-state image pickup device that enables rapid signal reading-out.

To achieve this objective, according to one aspect of the invention, there is provided an image pickup apparatus comprises:

a plurality of unit cells each including a photoelectric conversion unit;

processing means for processing signals from the unit cells;

transfer means for transmitting signals from the processing means;

impedance conversion means provided between the unit cells and the processing means;

bias supply means for supplying a bias to the impedance conversion means; and interlock means for causing the bias supply means and the transfer means to operate interlockingly.

According to another aspect of the invention, there is provided an image pickup apparatus comprises:

an image pickup area, wherein unit cells, each of which includes a photoelectric conversion unit, are arranged two-dimensionally;

a plurality of vertical output lines arranged in columnar direction, for reading out signals from the image pickup area;

processing means provided for each of the vertical output lines, for processing signals output from the unit cells;

transfer means for transferring the signals from the processing means;

impedance conversion means provided between the unit cells and the processing means;

bias supply means for supplying a bias to the impedance conversion means; and interlock means for causing the bias supply means and the transfer means to operate interlockingly.

According to a still another aspect of the invention, there is provided an image pickup apparatus comprises:

a plurality of unit cells each including a photoelectric conversion unit;

a plurality of accumulation means for accumulating signals from the plurality of unit cells;

a common output line adapted to sequentially read out signals accumulated in the plurality of accumulation means;

transfer means for transferring the signals from the unit cells to the plurality of accumulation means;

impedance conversion means provided between the unit cells and the transfer means;

bias supply means for supplying a bias to the impedance conversion means; and interlock means for causing the bias supply means and the transfer means to operate interlockingly.

According to a still another aspect of the invention, there is provided an image pickup apparatus comprises:

a photoelectric conversion unit;

impedance conversion means for processing a signal received from the photoelectric conversion unit;

first switching means for supplying a bias to the impedance conversion means;

second switching means connected between a bias source and the impedance conversion means; and drive means for driving the first switching means and the second switching means synchronizingly with each other.

According to a still another aspect of the invention, there is provided an image pickup apparatus comprises:

a photoelectric conversion unit;

impedance conversion means for processing a signal received from the photoelectric conversion unit;

first switching means for supplying a bias to the impedance conversion means;

second switching means for sampling and holding a signal from the photoelectric conversion unit to an input unit of the impedance conversion means; and drive means for turning on the first switching means before the second switching means is turned on.

Other objectives and features of the invention will become apparent during the course of the following explanation, which is given while referring to the accompanying drawings.

DETAILED DESCRIPTION OF THE PREFERRED EMBODIMENTS

Figure 1:
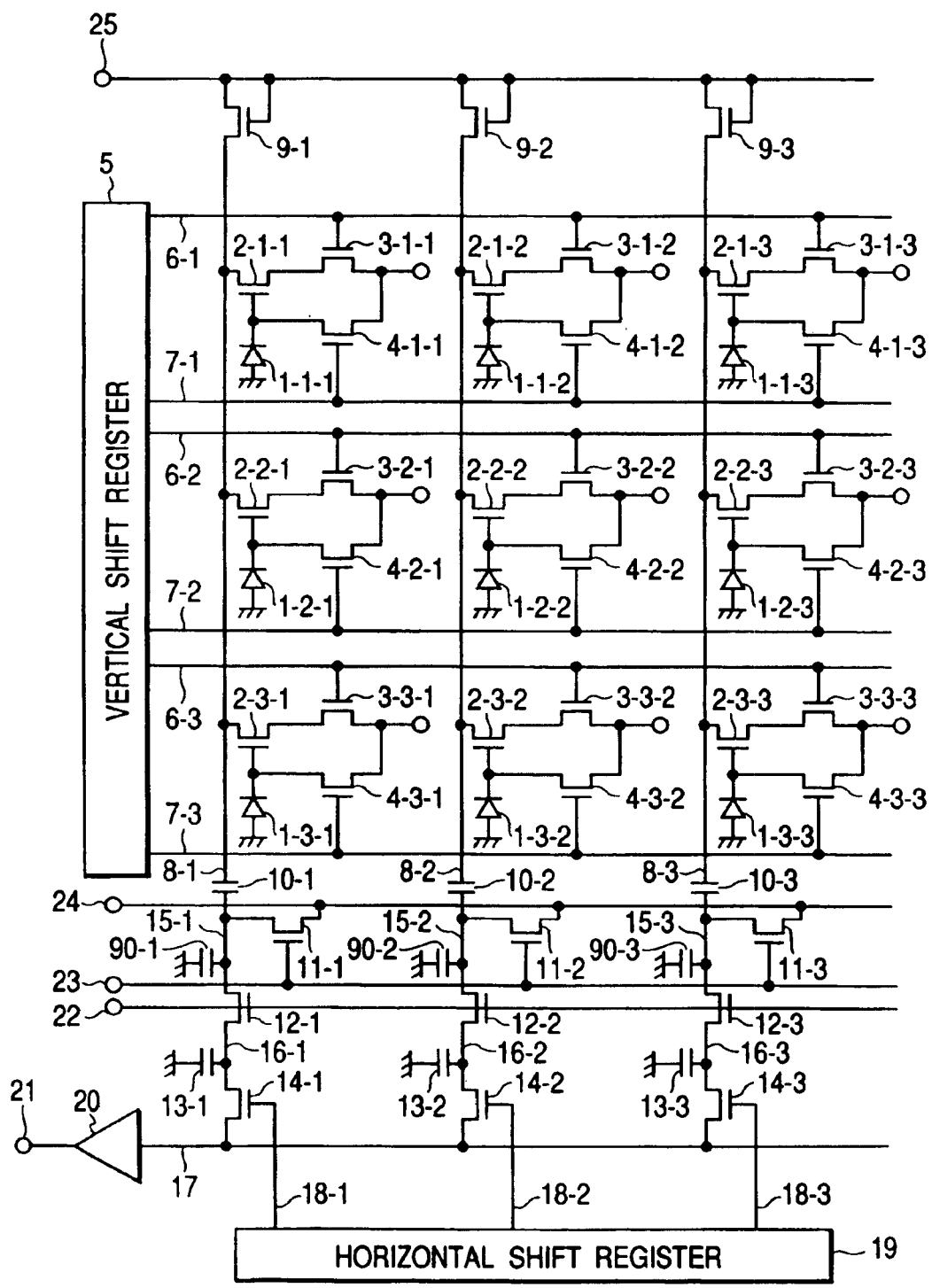
FIG. 1 is a block circuit diagram showing a conventional solid-state image pickup device.
Figure 2:
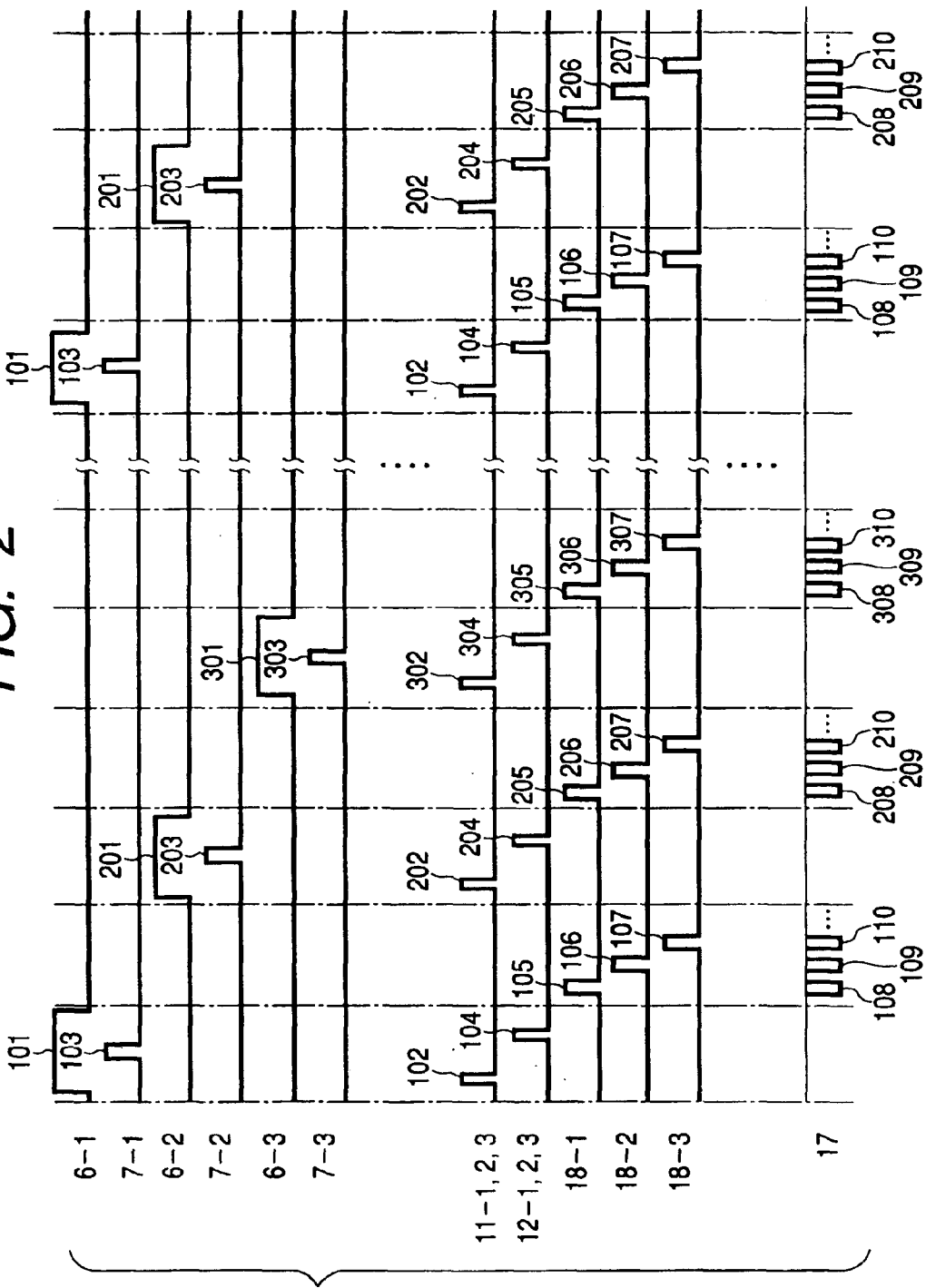
FIG. 2 is a timing chart for explaining the operation of the conventional solid-state image pickup device.
Figure 3:
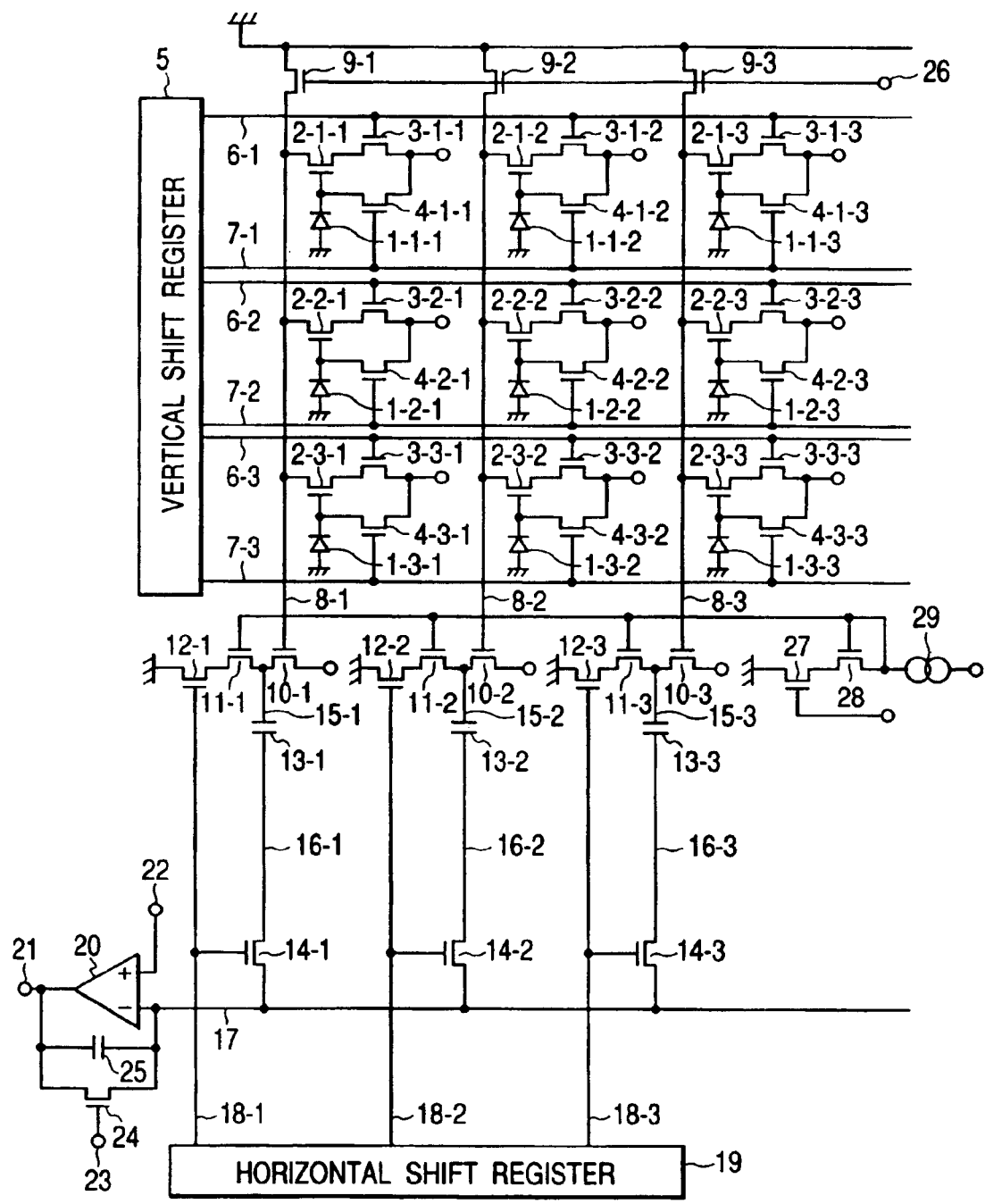
FIG. 3 is a diagram showing a first embodiment of the present invention wherein sensor cells are two-dimensionally arranged in three rows and three columns.

FIG. 3 is a plan view of the structure of a solid-state image pickup device using an amplification-type MOS sensor, according to a first embodiment of the present invention. To simplify the explanation, the sensor cells are arranged two-dimensionally in three rows and three columns. The structure of a censor cell is the same as in the prior art shown in FIG. 1.

In FIG. 3, an electric charge accumulated in a photodiode 1 (1-1-1, 1-1-2, . . . ) in each censor cell is amplified as a voltage by a source follower circuit which is constituted by an amplifying transistor 2 (2-1-1, 2-1-2, . . . ) and a load transistor 9 (9-1, 9-2 or 9-3), and the amplified voltage is read out to a vertical signal line 8 (8-1, 8-2 or 8-3). The source of the load transistor 9 is connected to the GND, and the gate is biased using a predetermined voltage applied to a terminal 26, so that a constant current circuit is formed.

The vertical signal line 8 is connected to the gate of a transistor 10 which constitutes the source follower circuit. When a selection signal line 18 (18-1, 18-2 and 18-3) from a horizontal shift register 19 is at level "H", a transistor 12 is turned on, and since a constant current source 29 and a transistor 28 form a current mirror circuit, a constant current transistor 11 (11-1, 11-2 or 11-3) whose gate is biased, is activated. Thus, a potential that corresponds to the potential of the vertical signal line 8 appears on a vertical signal line 15 (15-1, 15-2 or 15-3), and a signal is transmitted via a clamp capacitor 13 (13-1, 13-2 or 13-3) and a horizontal transfer switch 14 (14-1, 14-2 or 14-3) to a common horizontal signal line 17. The received charge signal is converted into a voltage by a feedback capacitor 25 which is connected between the input and output terminals of an output amplifier 20, and the voltage is output at an output terminal 21.

A reference voltage $V_R$ is applied to a terminal 22, and when a switch 24 is turned on, the output amplifier 20 forms a voltage follower structure, wherein a capacitor 25 is connected to the input/output terminal, and the voltage obtained by adding the reference voltage $V_R$ to the offset voltage of the amplifier 20 is output at the output terminal 21.

Figure 4:
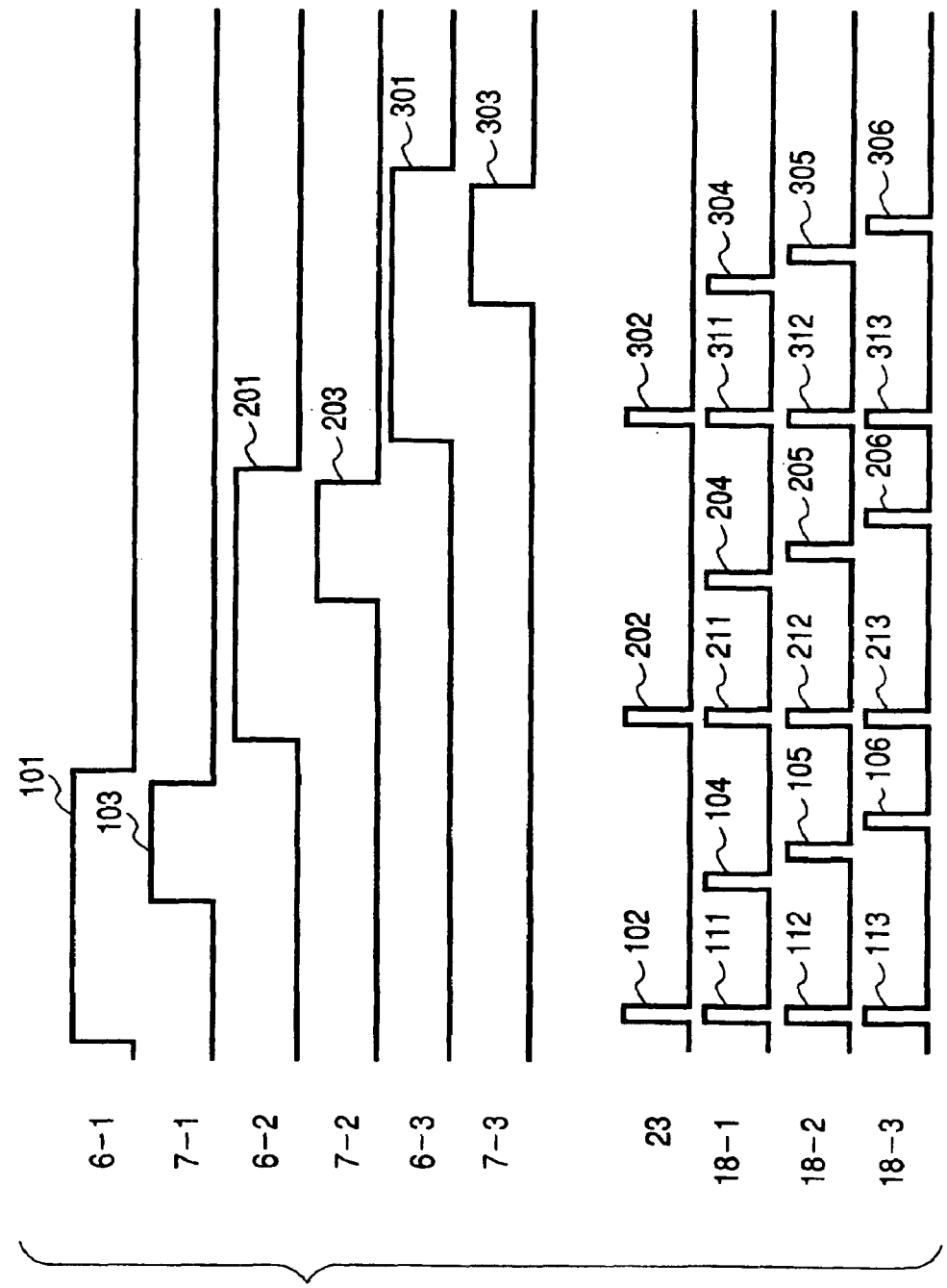
FIG. 4 is a timing chart for the first embodiment.

The operation of the solid-state image pickup device will now be explained while referring to the timing chart in FIG. 4, using the reference numerals provided for the components in FIG. 3.

First, when the pulse 101 is applied to the selection signal line 6-1, the selection switches 3 (3-1-1, 3-1-2 and 3-1-3) are turned on, and the amplifying transistors 2 (2-1-1, 2-1-2 and 2-1 3) are activated. At this time, an output signal voltage corresponding to the signal charge accumulated in the cathode of the photodiode 1, is read out to the vertical signal line 8 (8-1, 8-2 or 8-3). Thereafter, the voltage at level "H" (pulse 102) is applied to a terminal 23, and the output amplifier 20 is reconfigured as a voltage follower structure, so that the reference voltage $V_R$ applied to the terminal 22 is applied to the horizontal signal line 17 by the amplifier 20.

Further, at this time, the horizontal selection signal line 18 (18-1, 18-2 or 18-3) goes to level "H" (pulse 111, 112 or 113), and the horizontal selection transistor 14 (14-1, 14-2 or 14-3) and the transistor 12 (12-1, 12-2 or 12-3) are turned on. Thus, the bias current source transistor 11 (11-1, 11-2 or 11-3) which constitutes the source follower connected to the vertical signal line 8, is activated, and a potential (hereinafter referred to as $V_S$) corresponding to the potential of the vertical signal line 8 appears on the vertical signal line 15 (15-1, 15-2 or 15-3) which is connected to the source terminal of the transistor 10 (10-1, 10-2 or 10-3). Subsequently, the reference voltage $V_R$ is applied to the vertical signal line 16 (16-1, 16-2 or 16-3) via the horizontal selection transistor 14, and the terminal voltage $(V_S-V_R)$ is applied to the clamp capacitor 13 (13-1, 13-2 or 13-3).

The ratio (W/L) of the gate width (W) and the gate length (L) of the transistor 10, the value of the bias current of the constant current transistor 11, and the ON resistances of the switches 24 and 14 are so set that the clamp capacitor 13 can be adequately charged or discharged within the time spans for the pulses 102, 111, 112 and 113.

The output impedance of the source follower 10 (10-1, 10-2 or 10-3) is represented as $$Z_0 = \frac{1}{\sqrt{K\frac{W}{L}I_D}} \quad (1)$$

where K denotes a constant, W and L respectively denote the gate width W and the gate length L of the transistor 10, and $I_D$ denotes the drain current of the transistor 10.

Thereafter, a voltage "H" (pulse 103) is applied to the reset signal line 7 (7-1, 7-2 or 7-3), and the photodiode 1 is reset. The voltage at the reset time appears on the vertical signal line 8, and a voltage corresponding to this voltage appears on the vertical signal line 15 via the source follower of the transistor 10. This voltage is referred to as a voltage $V_N$. At this time, when the horizontal selection lines 18 are again sequentially raised to level "H" (pulses 104, 105 and 106), the signal is transmitted to the horizontal signal line 17.

The horizontal signal line 17 is connected to the negative input terminal of the output amplifier 20, and the reference voltage $V_R$ is applied to the positive input terminal via the terminal 22. Thus, because of the negative feedback effect of the amplifier 20, the potential of the horizontal signal line 17 is also maintained at $V_R$. When the potential of the vertical signal line 15 is $V_S$, the charge Q1 held by the clamp capacitor 13 is represented by $$Q1 = C_{13} \times (V_S - V_R) \quad (2)$$

where $C_{13}$ denotes the capacitance of the clamp capacitor

When the potential of the vertical signal line 15 is changed to $V_N$, and the horizontal transfer switch 14 is turned on, the charge Q2 on the clamp capacitor 13 is $$Q2 = C_{13} \times (V_N - V_R) \quad (3).$$

The difference between the charges Q1 and Q2 is moved to the negative feedback capacitor 25, and the inter-terminal voltage is $$Vin = \{C_{13} \times (V_S - V_R) - C_{13} \times (V_N - V_R)\} / C_{25} \quad (4)$$
$$= C_{13}/C_{25} \cdot (V_S - V_N)$$

where $C_{25}$ denotes the capacitance of the negative feedback capacitor 25. Since the negative terminal voltage at the output amplifier 20 is $V_R$, the voltage at the output terminal 21 is $$Vout = V_R + C_{13}/C_{25} \cdot (V_S - V_N).$$

As is described above, according to the solid-state image pickup device, a clamp circuit for a noise canceling circuit for suppressing noise that appears on the vertical signal line 8 is provided by using the capacitor 13 provided between the vertical signal line 8 and the horizontal selection transistor 14. Further, the constant current device 11 for supplying the bias current and the switch 12 for changing the output current of the constant current device are provided for the impedance conversion means between the vertical signal line 8 and the capacitor 13 in the clamp circuit. Therefore, the chip size can be reduced compared with when the W/L of the amplified MOS transistor in each sensor cell is increased. In addition, at a time other than the time at which the clamp capacitor 13 was reset, only one bias current flows from the source follower connected to the vertical signal line 8 over the same period of time. Thus, the increase in the consumed current can be dramatically suppressed.

Figure 5:
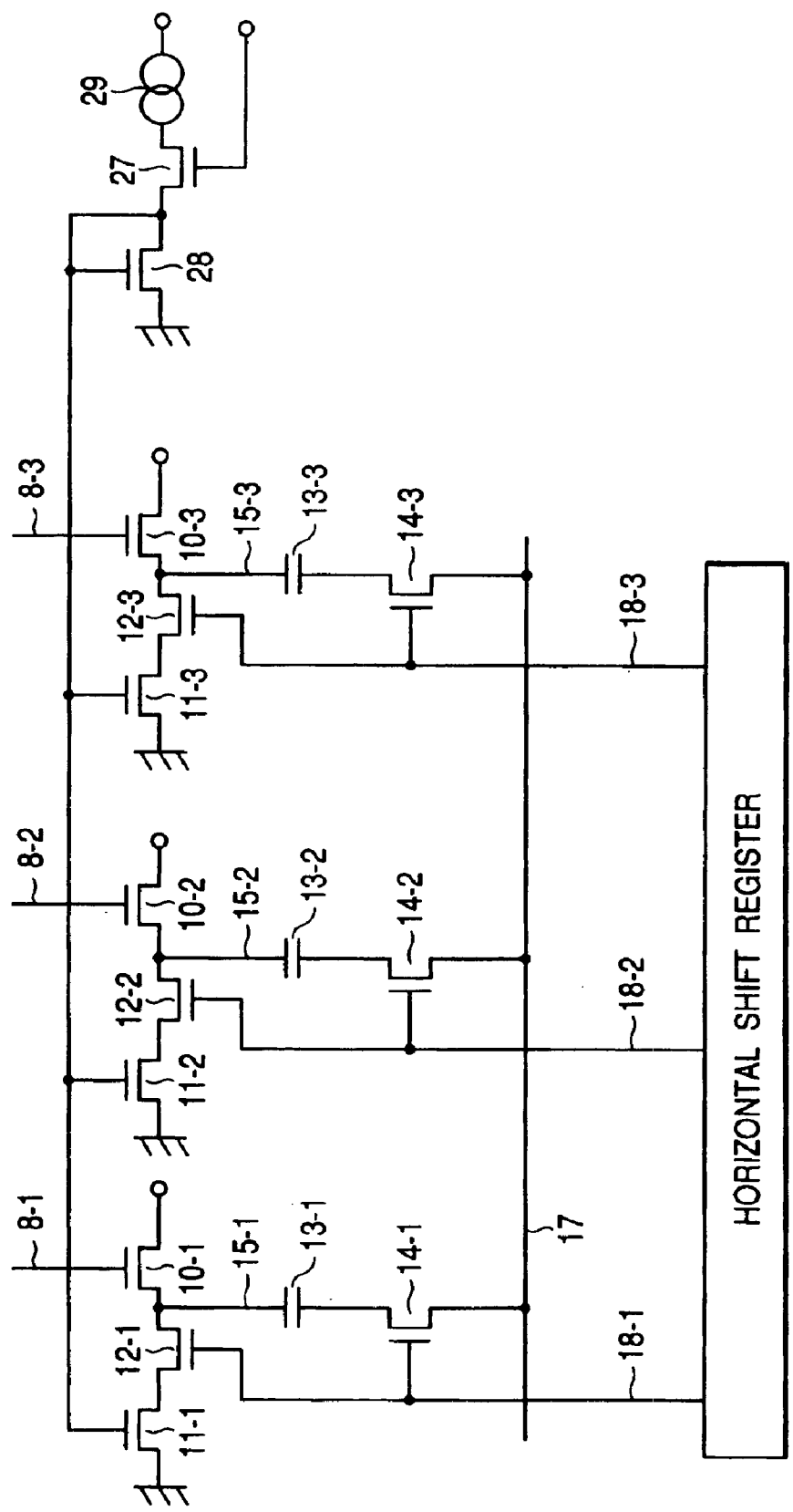
FIG. 5 is a diagram showing vertical signal lines and horizontal signal lines according to a second embodiment of the present invention.

FIG. 5 is a block circuit diagram for a second embodiment of the present invention. Only one part of the first embodiment configuration in FIG. 3 is changed.

The same reference numerals as are used in FIG. 3 are also used to denote corresponding components. The only differences are the connections for transistors 10, 11 and 12 which constitute the source follower. In FIG. 3, the transistor 11 which serves as a constant current transistor, is provided between the switch transistor 12 and the source follower transistor 10, while in FIG. 5, the constant current transistor 11 is provided closer to the GND line and the switch transistor 12 is provided between the constant current transistor 11 and the source follower transistor 10.

This arrangement difference also appears as a characteristic difference, and the input side potentials 15 of the vertical signal line 8 and the clamp capacitor 13 may greatly fluctuate due to fluctuation in the sensor cells and in the intensity of light incident onto the sensor. When the transistors are connected as is shown in FIG. 5, the gate-drain voltage of the switch transistor 12 is also changed in accordance with the potential fluctuation. Since the ratio at which the charges at the gate of the transistor 12 are distributed to the drain and source when the switch 11 is turned off, depends on the gate-drain voltage, the quantity of the charge held by the clamp capacitor 13 is slightly changed after the switch 12 has been turned off. Further, the quantity of the charge to be transmitted to the horizontal signal line 17 when the potentials on the vertical signal lines 8 and 15 differ, is also changed, and noise appears.

However, the operation of the image pickup element as the impedance converter is performed in the same manner as in the first embodiment, and satisfactory technological advantage can be obtained to increase the reading speed of the reading circuit.

Figure 6:
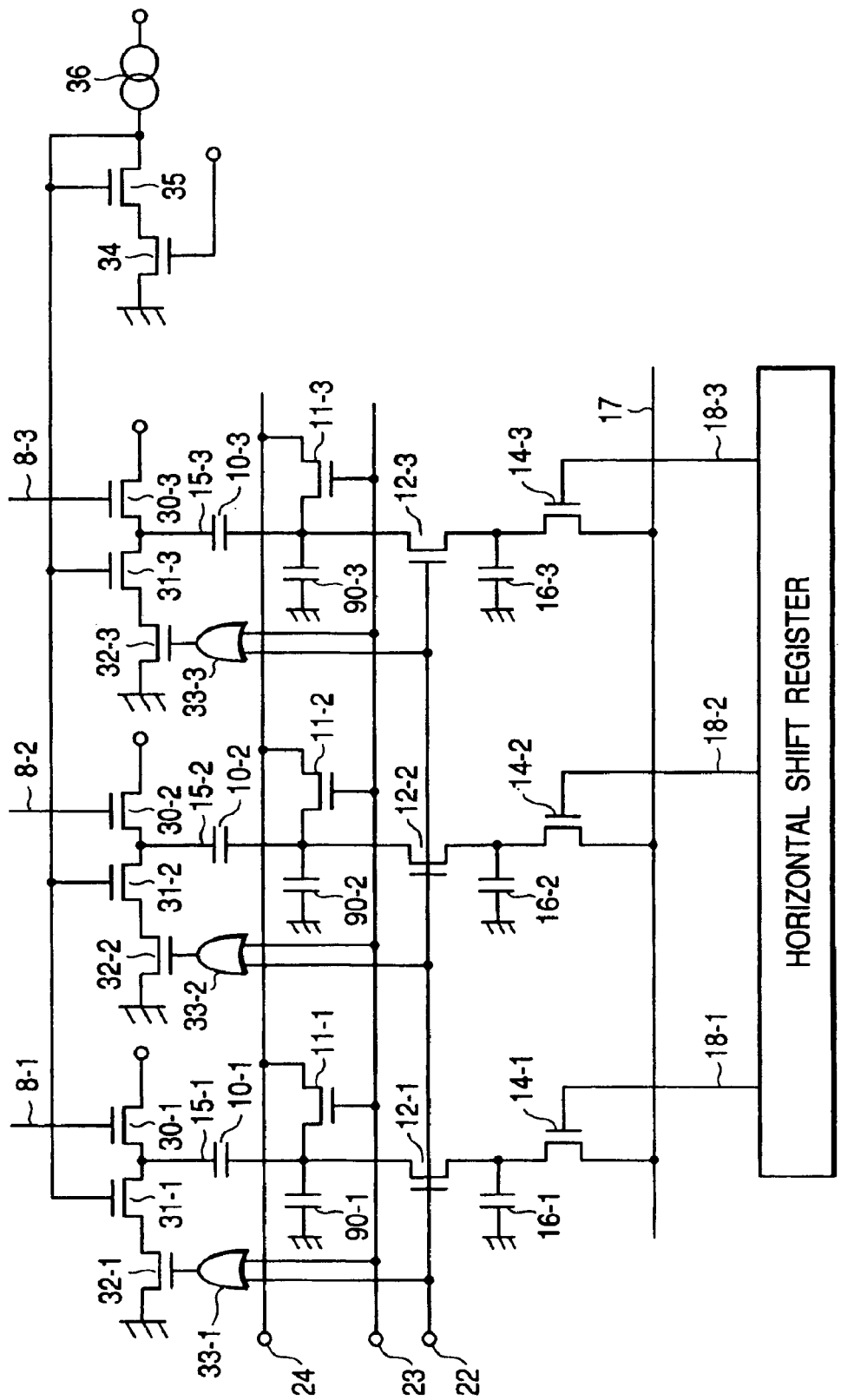
FIG. 6 is a diagram showing a third embodiment wherein both a clamp capacitor and a sample-hold capacitor are included.

FIG. 6 is a circuit diagram showing a solid-state image pickup device according to a third embodiment of the present invention. The prior art portion in FIG. 1 covering the vertical signal lines 8 (8-1, 8-2, . . . ) to the horizontal signal line 17 is extracted.

In FIG. 6, transistors 30 (30-1, 30-2, . . . ), transistors 31 (31-1, 31-2, . . . ), and transistors 32 (32-1, 32-2, . . . ) constitute a source follower which is connected to the vertical signal lines 8. When a switch 32 is turned on, the transistors 31 and 35 which have a current mirror structure, supply to the transistor 30 a current that is substantially equal to the current provided by a constant current source 36. As explained while referring to FIG. 1, a capacitor 90, of the MOS transistor 11 on the output side of a clamp capacitor 10 connected to a vertical signal line 15, a sample-hold switch MOS transistor 12, a sample-hold capacitor 16, and a horizontal transfer transistor 14 which is driven by a horizontal shift register 19 that sequentially outputs a signal to a horizontal output line, are connected together. Further, the output terminal of an OR circuit 33 which receives timing pulses and calculates the logical sum of the timing pulses received from supply terminals 22 and 23, is connected to the gate of a switch 32.

When the switch 32 is turned on, the source follower transistor 30 is activated. The source follower transistor 30 then outputs to the vertical signal line 15 (15-1, 15-2, . . . ) a potential corresponding to the potential on the vertical signal line 8, and transmits a signal via the horizontal transfer switch 14 (14-1, 14-2, . . . ) to the horizontal signal line 17, as in the prior art in FIG. 1.

When the terminal 23 or 22 goes to a level "H" when the clamp capacitor 10 must be driven, the output of the OR circuit 33 (33-1, 33-2, . . . ) also goes to level "H", and the switch 32 is turned on. Thus, the source follower 30 drives the clamp capacitor 10 at high speed.

The size (ratio W/L of the gate width W and the gate length L) of the source follower 30 and the value of the drain current of the constant current transistor 31 having the current mirror structure are so set that the clamp capacitor 10 can be satisfactorily driven by the terminals 22 and 23 with the pulse width at level "H". As a result, the increase in the speed of the reading circuit can be coped with.

Figure 7:
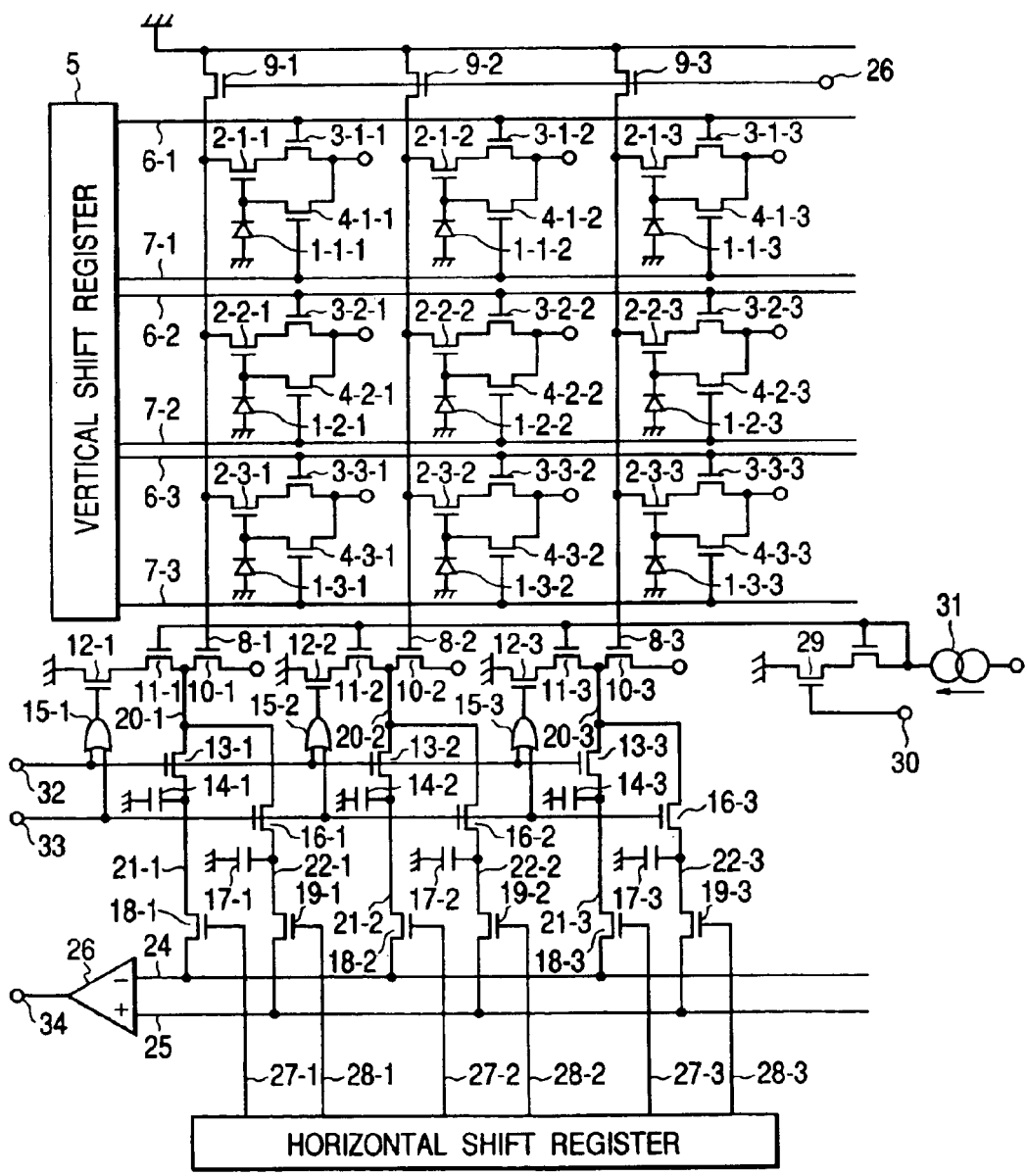
FIG. 7 is a diagram showing a fourth embodiment wherein only a sample-hold capacitor is included.

FIG. 7 is a block circuit diagram of a solid-state image pickup device according to a fourth embodiment of the present invention. Unlike the first and the third embodiments, a sample-hold capacitor 14 and 17 rather than the clamp capacitor, is driven with the vertical signal line 8. The operation and the structure of the sensor cell are the same as those for the first and the third embodiments, and when the signal voltage is read out from the sensor cell to the vertical signal line 8, the terminal 32 is raised to level "H" and the switch 12 (12-1, 12-2 or 12-3) is turned on by the OR gate 15, so that the source follower 10 (10-1, 10-2 or 10-3) is activated. The source follower 10 outputs a potential, corresponding to the potential of the vertical signal line 8, to a vertical signal line 20 (20-1, 20-2 or 20-3). Then, when the switch 13 (13-1, 13-2, 13-3) is turned on, the potential of the vertical signal line 20 is fetched by a hold capacitor 14 (14-1, 14-2 or 14-3).

Thereafter, when the sensor cell is reset by the signal from the vertical shift register 5, the reset potential is fetched to the vertical signal line 8. At this time, a pulse at level "H" is applied to the terminal 33, and the switch 12 is turned on by the OR gate 15 and the source follower 10 is activated. The potential corresponding to the reset potential of the vertical signal line 8 appears on the vertical signal line 20, and when the switch 16 (16-1, 16-2 or 16-3) is turned on at the same time, the potential on the vertical signal line 20 is fetched by the sample-hold capacitor 17 (17-1, 17-2 or 17-3). Then, the horizontal transfer signals 27 and 28 received from the horizontal shift register are sequentially changed to level "H", and the potential of the hold capacitor 14 is read out to a first horizontal signal line 24 while the potential of the hold capacitor 17 is read out to a second horizontal signal line 25.

The potentials of the two horizontal signal lines are subtracted by a subtraction amplifier 26, and a potential that corresponds to the difference between the signal potential and the reset potential is output at an output terminal 34.

As is described in the first to the fourth embodiments according to the invention, a source follower circuit that has an impedance conversion function is inserted between the vertical signal lines connected to the sensor cells and the clamp capacitors or the sample-hold capacitors that are connected, via switches, as loads to the vertical signal lines. The switches are inserted in series into the transistors that supply the bias current to the source follower, and are turned on only when the clamp capacitors or the sample-hold capacitors must be charged or discharged. Thus, when the capacitors are to be driven at high speed, the ratio (W/L) of the gate width (W) and the gate length (L) and the bias current need not be increased in order to reduce the output impedance of the amplified transistor in each sensor cell. As a result, increases in chip size and in power consumed can be minimized.

As is described above, according to the first to the fourth embodiments, increases in the signal transfer speed and in the reduction in power consumption can be achieved.

Figure 8:
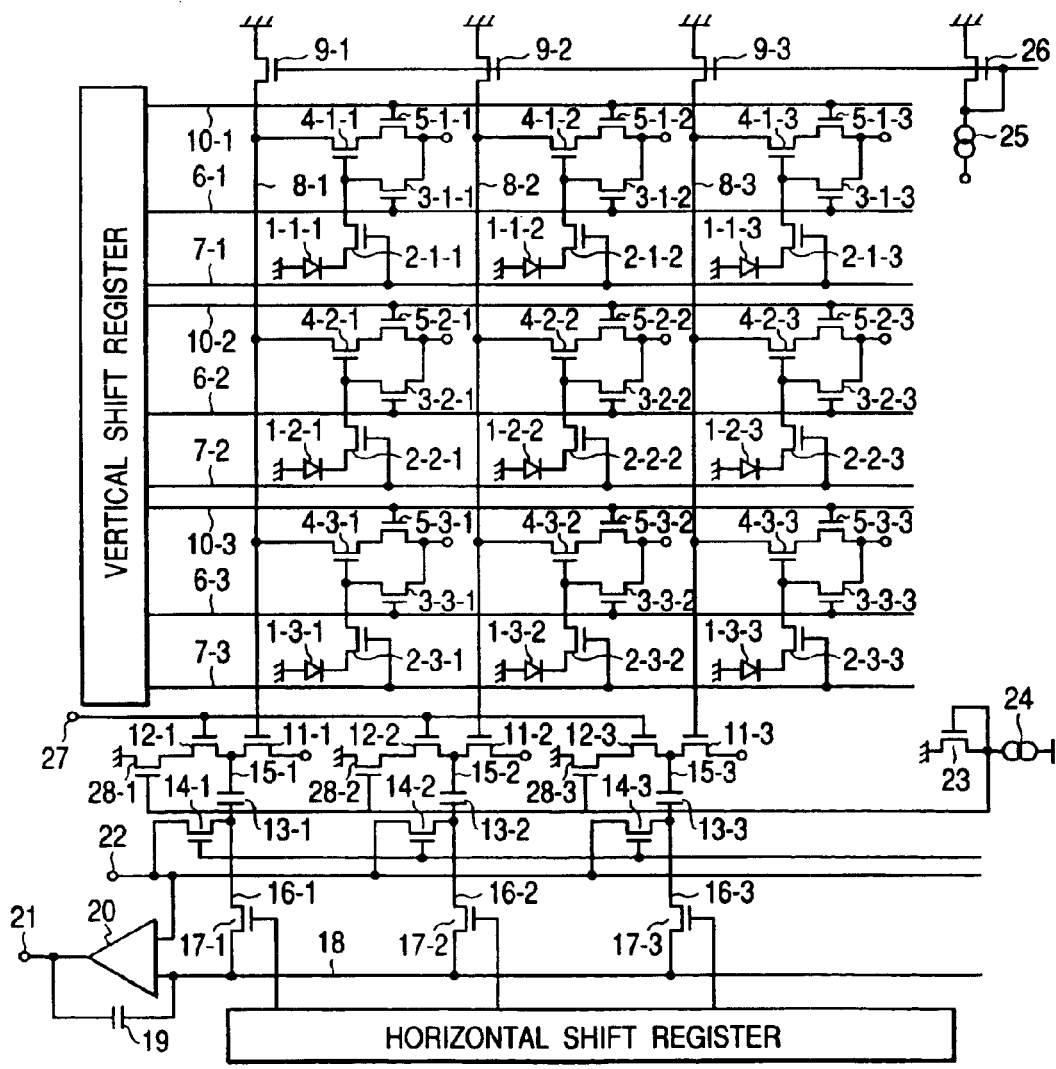
FIG. 8 is a diagram showing an image pickup element according to a fifth embodiment.

FIG. 8 is a diagram showing a solid-state image with photoelectric conversion cells arranged two-dimensionally pickup element according to a fifth embodiment, in particular, a source follower circuit that is provided to the vertical signal line and drives a parasite capacitor and a clamp capacitor connected to the vertical signal lines and that performs the impedance conversion for the output of the photoelectric conversion cell. In the source follower circuit, a switch for reducing the power consumed is added to a constant current circuit for supplying a bias current. The image pickup element comprises: photodiodes 1; transfer switches 2; reset switches 3; amplifying transistors 4; selection switches 5; reset signal lines 6 driven by a vertical shift register; transfer signal lines 7; constant current transistors for supplying a bias current to the amplifying transistors 4; selection signal lines 10; source follower circuits 11 for performing impedance conversion of sensor signals that appear on the vertical signal lines 8 and for driving clamp capacitors 13; constant current transistors 28 for supplying a bias current to the source follower transistors 11; switches 12 for controlling the ON/OFF switching of the current of the constant current transistors 28; clamp switches 14 for supplying to the clamp capacitors 13 a reference voltage to be applied to a terminal 22; horizontal transfer switches 17; a common horizontal signal line 18; a feedback capacitor 19 for converting into a voltage signal charges transmitted across the common horizontal signal line 18; an output amplifier 20; an output terminal 21; circuits 23 and 24 for supplying a voltage to the constant current transistors 28; circuits 25 and 26 for supplying a reference voltage to the constant current transistors 9; and a pulse voltage input terminal 27 for driving the switches 12 that change the bias currents supplied by the constant current transistor 28.

The switch 12 is turned on only when the source follower circuit 11 needs to drive the clamp capacitor 13. When the current on the constant current circuit 28 is supplied to the source follower 11, the consumed power can be reduced dramatically, compared with when the current on the constant current circuit 28 is constantly supplied.

Figure 9:
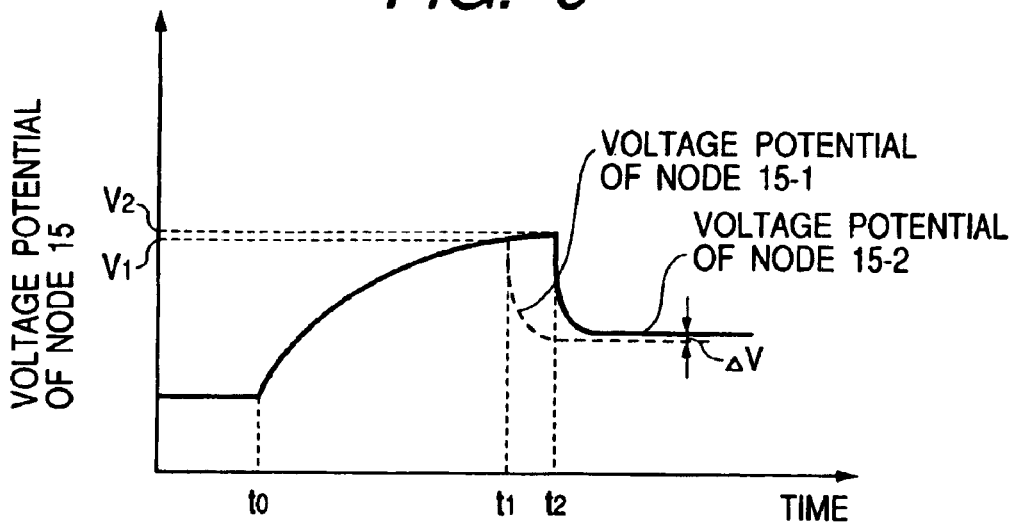
FIGS. 9, 10, 11, 12 and 13 are diagrams for explaining the fifth embodiment.

In FIG. 9 is shown the change in the potential at the node 15 when the switch 12 which was turned when the capacitor was driven by the source follower 11, is changed from on to off. At time t0, whereat the switch 12 is changed from the ON state to the OFF state, since the drain of the source follower 11 is connected to the power source, the node 15 is charged in accordance with a signal voltage applied to the gate terminal with a time constant that is determined by the sub-threshold area characteristic of the MOS transistor 11, and the potential is increased. Since one of the terminals of the clamp capacitor 13 is in the high-impedance state until the horizontal transfer switch connected thereto is turned on, the charge on the capacitor 13 is held. Thus, the same potential fluctuation as at the node 15 also occurs at the node 16, and the potential is increased. Since the virtual grounding of the amplifier 20 is established because of the circuit structure, the potential of the horizontal signal line is maintained as the reference voltage provided for the terminal 22.

Figure 10:
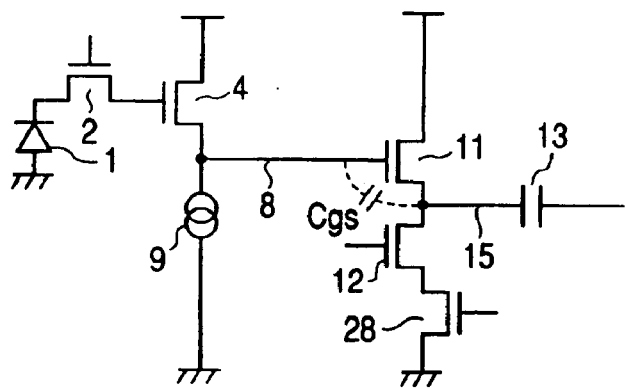

At time t1, one of the horizontal transfer switches (e.g., 17-1 in FIG. 8) is turned on, and at time t2 another horizontal switch (e.g., 17-2) is turned on. The potentials at the nodes 15-1 and 15-2 are increased following the time t0 with the same time constant, while the ON timing differs between the transfer switches 17-1 and 17-2. Thus, when the horizontal transfer switch 17 is turned on and the potential at the node 16 is shifted to the reference voltage, the change in the voltage differs between the nodes 16-1 and 16-2, and this difference in the voltage changes also appears at the node 15. Further, since the gate and the source of the source follower transistor 11 in FIG. 10 are coupled together by the parasite capacitor Cgs, change in the signal potentials appear on the vertical signal lines 8 (8-1 and 8-2) is made different.

Therefore, even when the same signal potential is applied to the two vertical signal lines 8-1 and 8-2, the output impedance of the amplifying transistor 4 in the same pixel cell is not low, so that the potential change that occurs when the horizontal transfer switch is turned on or off can not be suppressed. Thus, the output signal potential is changed, and noise, called fixed pattern noise, is generated.

Figure 11:
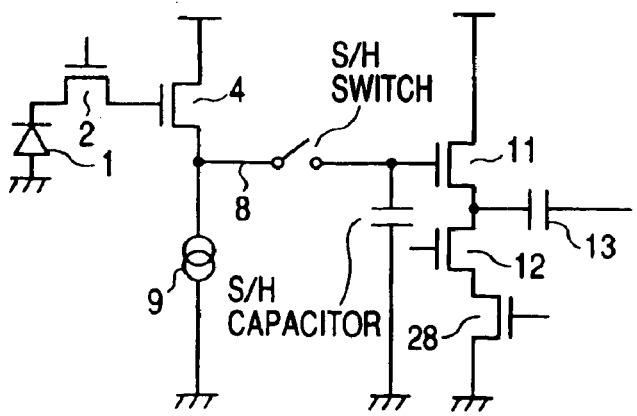

FIG. 11 is a diagram showing the circuit structure wherein the above described effects appear more prominently, which includes a sample-hold circuit that is inserted between the sensor cell and the vertical signal line source follower 11. The other reference numerals are the same as those in FIG. 8. When the horizontal transfer switch is on, the signal potential on the hold capacitor is changed by a value that is determined by dividing the charges between the gate-source parasite capacitor Cgs of the source follower 11 and the hold capacitor in the sample-hold circuit.

Further, as is shown in FIG. 11, when the sample-hold circuit is inserted between the sensor cell and the vertical signal line source follower, the gate-source parasite capacitor Cgs of the source follower transistor is added as a part of the hold capacitor of the sample-hold circuit, and its capacitance differs depending on the operating area of the MOS transistor. When the ON timing for the bias current supply switch 12 of the source follower is set after the OFF timing of the sample-hold circuit, when the bias current switch has been turned on, the gate potential at the source follower is changed by a value equivalent to the change in the operating area of the capacitor Cgs. Since the capacitance of the parasite capacitor Cgs is affected by manufacturing fluctuation caused during the gate oxide layer deposition process, a problem exists in that fixed pattern noise appears at the gate potential.

Therefore, a switch is inserted between the drain terminal of the vertical signal line source follower and the power source, and the ON/OFF timing for this switch is synchronized with the ON/OFF timing for the bias current supply switch. Thus, when the bias current supply switch is OFF, the current supply source for charging the node 15 is not available, and the potentials at the nodes 15 and 16 are not raised until the horizontal transfer switch is turned on. As a result, the fixed pattern noise that appears when the horizontal transfer switch is turned on can be eliminated.

In addition, since the ON timing for the bias current switch is set before the ON timing of the sample-hold circuit which is provided between the sensor cell and the vertical signal line source follower as is shown in FIG. 11, the capacitance of the capacitor Cgs when the vertical signal line source follower is turned on is added to the hold capacitor of the sample-hold circuit. Therefore, the above problem can be resolved.

Figure 12:
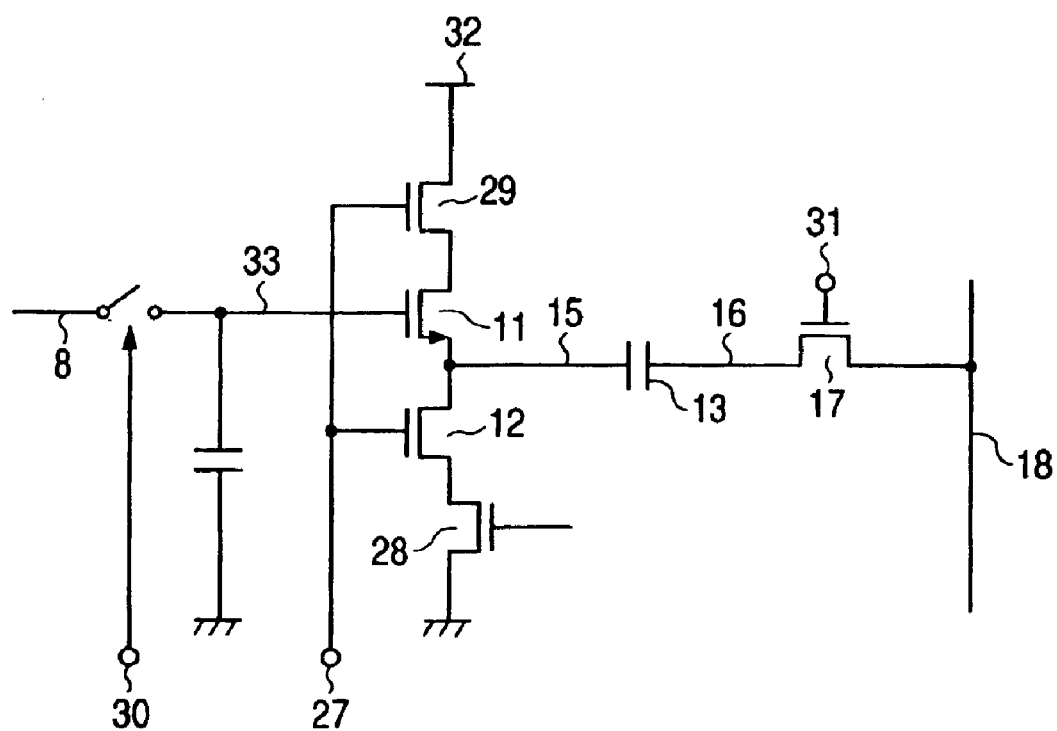

In FIG. 12 is shown only the portion in FIG. 8 that covers the circuit from the vertical signal lines to the common horizontal signal line, especially, a sample-hold circuit that is inserted between the vertical signal line 8 and the source follower transistor 11. When a switch 29 shown in FIG. 12 is inserted and is driven along the same clock line as is the bias current supply switch, and when the supply of the bias current to the source follower transistor 11 is halted, the drain of the source follower 11 is disconnected from a power line 32, and no current supply path for charging the node 15 is available.

Figure 13:
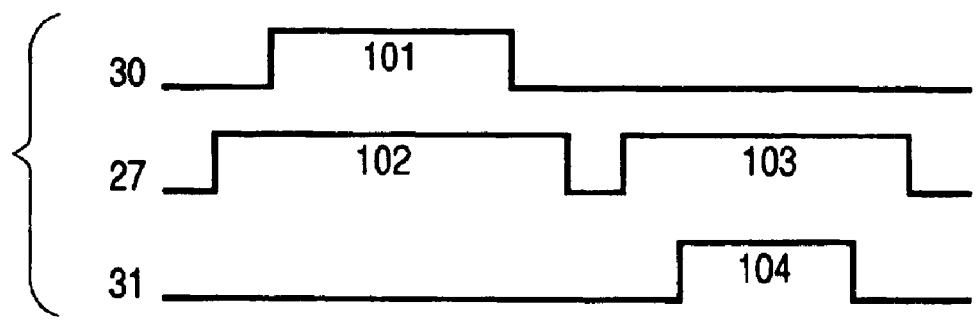

FIG. 13 is a diagram showing the relationship of the ON/OFF timings for the switches 12 and 29 and the timings for the other switches. A pulse 30 is used to derive the sample-hold switch, a pulse 27 is to be applied to the terminals 27 for driving the switches 12 and 29, and a pulse 31 is used to drive the horizontal transfer switch 17. The pulse 102 is applied to the terminal 27 before the pulse 101 for turning on the sample-hold switch goes to level "H", the switches 12 and 29 are turned on, and the capacitance Cgs of the source follower 11 is set to the value obtained when the source follower transistor is turned on. After the sample-hold switch is turned off, the switches 12 and 29 are also turned off. Before the horizontal transfer switch 17 is turned on, the switches 12 and 29 are turned on again by the application of the pulse 103 in order to drive the clamp capacitor 13 when the switch 17 is turned on by the application of the pulse 104.

In FIG. 12, the source follower 11 is the NMOS. When a PMOS is employed, it can be easily understood that the switch 29 will be inserted between the drain terminal and the GND (or a specific low voltage line).

As is described above, when the NMOS source follower is employed, a switch is inserted between the drain terminal and a high voltage source, while, when the PMOS source follower is employed, a switch is inserted between the drain terminal and a low voltage source. The ON/OFF control for the switch is synchronized with the ON/OFF control for the switch that controls the supply of the bias current to the source follower. Therefore, when the switch is turned off and the supply of the bias current is halted, the potential at the output terminal of the source follower is prevented from being raised due to the charging of the parasite capacitor, and the change in the sensor output, called fixed pattern noise, is suppressed.

Furthermore, when the sample-hold circuit is inserted between the vertical signal line and the source follower, the timing whereat the sample-hold switch is changed from the ON state to the OFF state is delayed relative to the timing whereat the bias current supply control switch is changed from the OFF state to the ON state, and the timing whereat the sample-hold switch is changed from the ON state to the OFF state is performed earlier relative to the timing whereat the bias current switch is changed from the OFF state to the ON state. Thus, the appearance of the fixed pattern noise of the sensor output can be suppressed.

Figure 14:
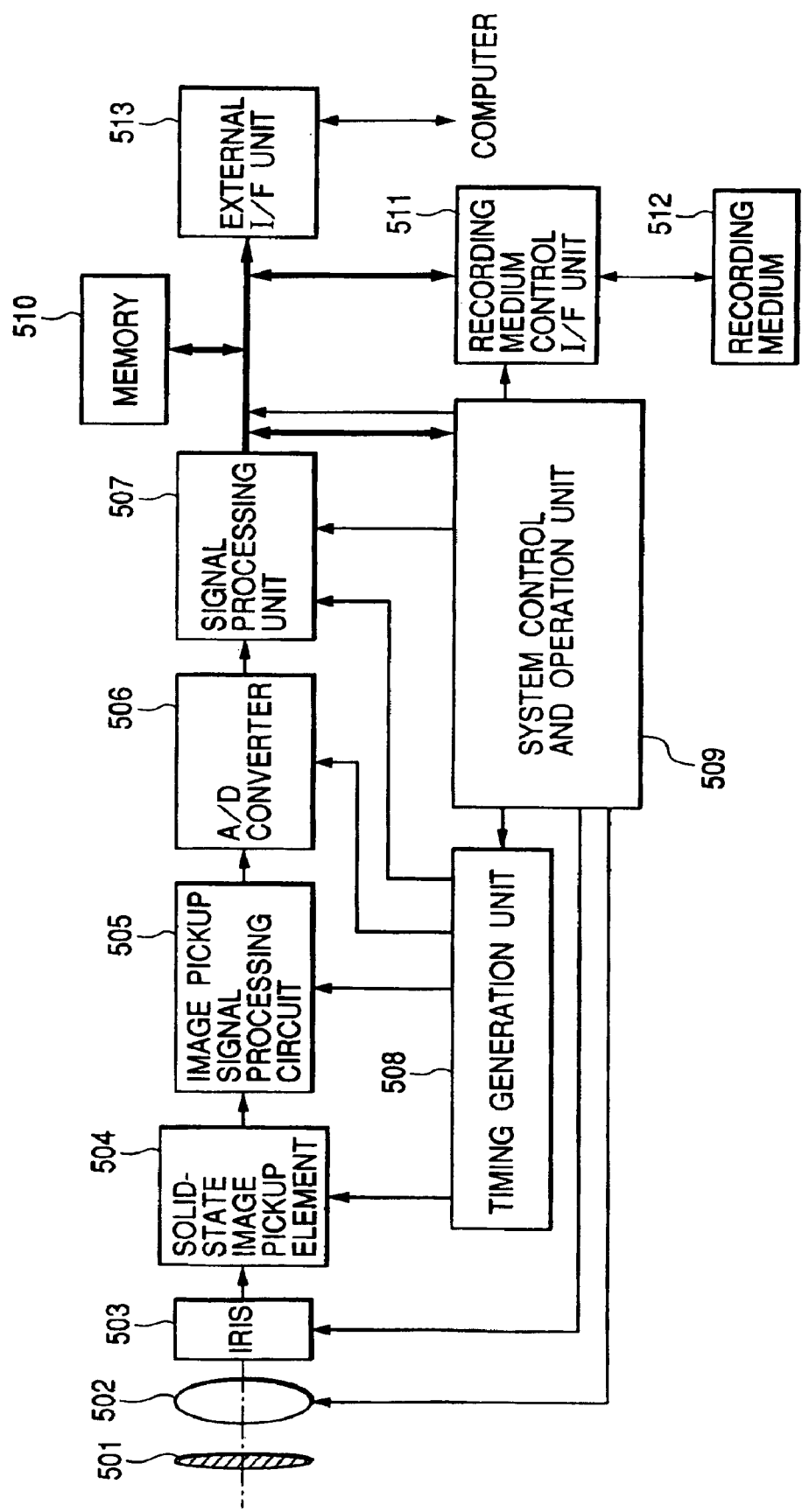
FIG. 14 is a diagram for explaining, according to a sixth embodiment, an image pickup apparatus, such as a digital camera, to which the solid-state image pickup device of one of the first to the fifth embodiments is employed.

A description of an image pickup apparatus, such as a digital still camera, for which the solid-state image pickup device featured in the first to the fifth embodiments is employed, will now be presented as a sixth embodiment while referring to FIG. 14.

In FIG. 14, the image pickup apparatus comprises: a barrier 501 which serves as a protector for a lens and a main switch; a lens 502 for focusing the optical image of an object on a solid-state image pickup device 504; an iris 503 for varying the amount of light passing through the lens 502; the solid-state image pickup device 504 for obtaining the object image as an image signal; an image pickup signal processing circuit 505 for processing an image pickup signal; an A/D converter 506 for performing analog-digital conversion of the image signal output by the solid-state image pickup device 504; a signal processing unit 507 for performing various corrections for the image data output by the A/D converter 50, or for compressing the image data; a timing generation unit 508 for outputting various timing signals to the solid-state image pickup device 504, the image pickup signal processing circuit 505, the A/D converter 506 and the signal processing unit 507; a system control and operation unit 509 for performing various operations and for providing control for the entire still video camera; a memory 510 for temporarily storing the image data; an interface unit 511 for recording data to or reading out data from a recording medium; a detachable recording medium 512, such as a semiconductor memory, for the recording or the reading-out of image data; and an interface unit 513 for communicating with an external computer.

The image pickup operation of the thus structured still video camera will now be described.

When the barrier 501 is opened, the main power is turned on, the control system is powered on, and an image pickup circuit, such as the A/D converter 506, is powered on.

To control the light exposure value, the system control and operation unit 509 opens the iris 503, and the A/D converter 506 converts the signal received from the solid-state image pickup device 504 and transmits the obtained signal to the signal processing unit 507. Based on the obtained data, the system control and operation unit 509 performs an exposure calculation.

Brightness is determined from the result obtained for the photometry, and the system control and operation unit 509 controls the iris 3 in accordance with the result.

Then, the system control and operation unit 509 extracts a high frequency component from the signal output by the solid-state image pickup device 504, and calculates the distance to the object. Thereafter, the lens is moved and a determination is made as to whether the lens is focused on the object. When the lens is not focused on the object, the lens is driven to measure the distance. Then, once it has been ascertained that the lens is properly focused, the main exposure is begun.

When the exposure is completed, an image signal is output by the solid-state image pickup device 504 to the A/D converter 506. An A/D conversion of the image signal is performed, and the resulting signal is then transmitted to the signal processing unit 507 and is written in the memory 510 by the system control and operation unit 509.

Thereafter, the data stored in the memory 510 is transmitted, via the recording medium control I/F unit 511, by the system control and operation unit 509 and is recorded on a detachable recording medium 512, such as a semiconductor memory.

The image data may be transmitted directly to a computer, via the external I/F unit 513, so that the computer may process the image data.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
    a plurality of unit cells each including a photoelectric conversion unit;
    processing means for processing signals from said unit cells;
    transfer means for transmitting signals from said processing means;
    impedance conversion means provided between said unit cells and said processing means;
    bias supply means for supplying a bias to said impedance conversion means; and
    interlock means for causing said bias supply means and said transfer means to operate interlockingly.

2. An image pickup apparatus according to claim 1, wherein said processing means includes noise canceling means for removing a noise element from signals transmitted by said unit cells.

3. An image pickup apparatus according to claim 2, wherein said noise canceling means includes capacitor means.

4. An image pickup apparatus according to claim 3, wherein said bias supply means is activated when said capacitor means is charged or discharged during a noise canceling operation.

5. An image pickup apparatus according to claim 1, wherein said processing means includes a clamp circuit for clamping, at a predetermined signal level, signals transmitted by said unit cells.

6. An image pickup apparatus according to claim 1, wherein said impedance conversion means includes a voltage follower circuit, wherein said bias supply means includes a switch transistor connected in series to said voltage follower circuit, for supplying a current to said voltage follower circuit, wherein said transfer means includes a transfer transistor for transferring a signal from said voltage follower circuit, and wherein said interlock means includes a signal line for supplying a common pulse to control electrodes of said switch transistor and said transfer transistor.

7. An image pickup apparatus according to claim 6, wherein said voltage follower circuit includes a source follower circuit.

8. An image pickup apparatus comprising:
   an image pickup area, wherein unit cells, each of which includes a photoelectric conversion unit, are arranged two-dimensionally;
   a plurality of vertical output lines arranged in columnar direction, for reading signals from said image pickup area;
   processing means provided for each of said vertical output lines for processing signals output by said unit cells;
   transfer means for transferring said signals from said processing means;
   impedance conversion means provided between said unit cells and said processing means;
   bias supply means for supplying a bias to said impedance conversion means; and
   interlock means for causing said bias supply means and said transfer means to operate interlockingly.

9. An image pickup apparatus comprising:
   a plurality of unit cells each including a photoelectric conversion unit;
   a plurality of accumulation means for accumulating signals from said plurality of unit cells;
   a common output line adapted to sequentially read out signals accumulated in said plurality of accumulation means;
   transfer means for transferring said signals from said unit cells to said plurality of accumulation means;
   impedance conversion means provided between said unit cells and said transfer means;
   bias supply means for supplying a bias signal to said impedance conversion means; and
   interlock means for causing said bias supply means and said transfer means to operate interlockingly.

10. An image pickup apparatus according to claim 9, wherein said plurality of accumulation means includes first accumulation means for accumulating a first signal which is generated when said unit cells are reset, and second accumulation means for accumulating a second signal which is generated by accumulating optical charges in said photoelectric converter.

11. An image pickup apparatus according to claim 9, wherein said impedance conversion means includes a voltage follower circuit, wherein said bias supply means includes a switch transistor connected in series to said voltage follower circuit, for supplying a current to said voltage follower circuit, wherein said transfer means includes a transfer transistor for transferring a signal from said voltage follower circuit to said plurality of accumulation means, and wherein said interlocking means includes a signal line for supplying a common pulse to control electrodes of said switch transistor and said transfer transistor.

12. An image pickup apparatus comprising:
   a photoelectric conversion unit;
   impedance conversion means for processing a signal received from said photoelectric conversion unit;
   first switching means for supplying a bias to said impedance conversion means;
   second switching means connected between a bias source and said impedance conversion means; and
   drive means for driving said first switching means and said second switching means sychronizingly with each other.

13. An image pickup apparatus according to claim 12, wherein a clamp circuit is provided at the output terminal of said impedance conversion means.

14. An image pickup apparatus comprising:
   a photoelectric conversion unit;
   impedance conversion means for processing a signal received from said photoelectric conversion unit;
   first switching means for supplying a bias to said impedance conversion means;
   second switching means for sampling and holding a signal transmitted by said photoelectric conversion unit to the input unit of said impedance conversion means; and
   drive means for turning on said first switching means before said second switching means is turned on.

15. An image pickup apparatus according to claim 14, wherein said drive means turns off said second switch means before turning off said first switch means.

16. An image pickup apparatus according to claim 14, wherein a clamp circuit is provided at the output terminal of said impedance conversion means.

* * * * *

UNITED STATES PATENT AND TRADEMARK OFFICE
CERTIFICATE OF CORRECTION

PATENT NO. : 6,903,771 B2
DATED : June 7, 2005
INVENTOR(S) : Takamasa Sakuragi

It is certified that error appears in the above-identified patent and that said Letters Patent is hereby corrected as shown below:

Column 4,
Lines 40 and 43, "censor" should read -- sensor --.

Column 5,
Line 15, "2-1 3)" should read -- 2-1-3) --.

Column 8,
Line 47, "pickup" should read -- in a pickup --.

Signed and Sealed this

Fourth Day of October, 2005

JON W. DUDAS
*Director of the United States Patent and Trademark Office*